US012464442B2

(12) United States Patent
Thiebaut et al.

(10) Patent No.: US 12,464,442 B2
(45) Date of Patent: Nov. 4, 2025

(54) DETECTING UE PING-PONGING BETWEEN DIFFERENT NETWORK NODES

(71) Applicant: Nokia Technologies Oy, Espoo (FI)

(72) Inventors: Laurent Thiebaut, Nozay (FR); Bruno Landais, Lannion (FR); Yannick Lair, Nozay (FR)

(73) Assignee: Nokia Technologies Oy, Espoo (FI)

( * ) Notice: Subject to any disclaimer, the term of this patent is extended or adjusted under 35 U.S.C. 154(b) by 509 days.

(21) Appl. No.: 17/995,839

(22) PCT Filed: Mar. 10, 2021

(86) PCT No.: PCT/EP2021/055965
§ 371 (c)(1),
(2) Date: Oct. 7, 2022

(87) PCT Pub. No.: WO2021/204483
PCT Pub. Date: Oct. 14, 2021

(65) Prior Publication Data
US 2023/0156579 A1    May 18, 2023

Related U.S. Application Data

(60) Provisional application No. 63/007,924, filed on Apr. 9, 2020.

(51) Int. Cl.
*H04W 48/16* (2009.01)
*H04W 36/32* (2009.01)
*H04W 48/04* (2009.01)

(52) U.S. Cl.
CPC ......... *H04W 48/16* (2013.01); *H04W 36/324* (2023.05); *H04W 48/04* (2013.01)

(58) Field of Classification Search
CPC ..... H04W 48/16; H04W 48/04; H04W 24/08; H04W 36/00; H04W 8/00; H04W 8/065;
(Continued)

(56) References Cited

U.S. PATENT DOCUMENTS 9,160,515 B2    10/2015 Yiu et al.
10,499,294 B1 * 12/2019 Tayal et al. ....... H04W 36/0088
(Continued)

FOREIGN PATENT DOCUMENTS

WO    WO-2020030277 A1 *  2/2020 ............ H04W 24/02
WO    2020/066890 A1      4/2020

OTHER PUBLICATIONS

(CN 104185203 A), Yang et al.: A Method And Device For Detecting Ping-pong Switching (see title; abstract) (Year: 2014).*
(Continued)

*Primary Examiner* — San Htun
(74) *Attorney, Agent, or Firm* — Barta Jones, PLLC (57) ABSTRACT

Methods and apparatus, including computer program products, are provided for ping pong detection. In some example embodiments, there may be provided a method that includes subscribing to an event at one or more access and mobility management functions, the event indicative of a frequent mobility of a user equipment between different access and mobility management functions; and receiving, from an access and mobility management function, a notification of the subscribed event. Related systems, methods, and articles of manufacture are also described.

7 Claims, 4 Drawing Sheets

(58) Field of Classification Search
CPC ....... H04W 8/08; H04W 8/082; H04W 8/085;
H04W 8/14; H04W 8/16; H04W 8/12;
H04W 8/18; H04W 8/26; H04W 36/36;
H04W 28/0226; H04W 52/40; H04W
80/04; H04W 80/12; H04W 88/00; H04W
88/02; H04W 88/08; H04W 88/18; H04W
88/10; H04W 36/0066; H04W 4/02;
H04W 4/029; H04W 4/021; H04L 12/26;
H04T 2001/207; H04T 2001/205; H04M
15/8038; H04M 2215/34; H04M
2215/7442

See application file for complete search history.

(56) References Cited

U.S. PATENT DOCUMENTS

| | | | | |
|---|---|---|---|---|
| 11,432,174 | B2* | 8/2022 | Shariat et al. | H04W 24/10 |
| 2010/0304745 | A1* | 12/2010 | Patel et al. | 455/435.1 |
| 2019/0313212 | A1* | 10/2019 | Lee et al. | H04W 4/029 |
| 2020/0187061 | A1* | 6/2020 | Zhu | H04W 36/0027 |
| 2020/0314701 | A1* | 10/2020 | Talebi et al. | H04W 36/0016 |
| 2020/0323005 | A1* | 10/2020 | Chin | H04W 36/00837 |
| 2021/0051444 | A1* | 2/2021 | Ryu | G01S 19/47 |
| 2022/0039046 | A1* | 2/2022 | Ianev | H04W 60/00 |

OTHER PUBLICATIONS (KR 20140009171 A) System and Method for Providing User Notifications (see title) (Year: 2014).*
(CN 100512499 C) A Method For Preventing Ping-pong Handover And Device With Ping-pong Switching Filter Function (see title) (Year: 2009).*
"3rd Generation Partnership Project; Technical Specification Group Services and System Aspects; Architecture enhancements for 5G System (5GS) to support network data analytics services (Release 16)", 3GPP TS 23.288, V16.2.0, Dec. 2019, pp. 1-57.
"3rd Generation Partnership Project; Technical Specification Group Services and System Aspects; Procedures for the 5G System (5GS); Stage 2 (Release 16)", 3GPP TS 23.502, V16.3.0, Dec. 2019, pp. 1-558.
"Adding two new event IDs for AMF event exposure", 3GPP TSG-WG SA2 Meeting #137E e-meeting, S2-2001856, Huawei, Feb. 24-27, 2020, 3 pages.
"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.
"3rd Generation Partnership Project; Technical Specification Group Services and System Aspects; Architecture enhancements for 5G System (5GS) to support network data analytics services (Release 16)", 3GPP TS 23.288, V16.3.0, Mar. 2020, pp. 1-62.
"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.
"IEEE 802.11", Wikipedia, Retrieved on Nov. 9, 2022, Webpage available at : https://en.wikipedia.org/wiki/IEEE_802.11.
"IEEE 802.16", Wikipedia, Retrieved on Nov. 9, 2022, Webpage available at : https://en.wikipedia.org/wiki/IEEE_802.16.
"IEEE 802.3", Wikipedia, Retrieved on Nov. 9, 2022, Webpage available at : https://en.wikipedia.org/wiki/IEEE_802.3.
"IEEE 802.15", Wikipedia, Retrieved on Nov. 9, 2022, Webpage available at : https://en.wikipedia.org/wiki/IEEE_802.15.
"Corrections for detection of ping-ponging UEs", SA WG2 Meeting #138E, S2-20xxxxx, Nokia, Apr. 20-24, 2020, pp. 1-4.
International Search Report and Written Opinion received for corresponding Patent Cooperation Treaty Application No. PCT/EP2021/055965, dated Jun. 4, 2021, 15 pages.
"Detection of ping ponging UEs", SA WG2 Meeting #138E, S2-2003159, Nokia, Apr. 20-24, 2020, pp. 1-5.

* cited by examiner

DETECTING UE PING-PONGING BETWEEN DIFFERENT NETWORK NODES

RELATED APPLICATION

This application was originally filed as PCT Application No. PCT/EP2021/055965, filed on Mar. 10, 2021, which claims priority from U.S. Provisional Application No. 63/007,924, filed on Apr. 9, 2020, each of which is incorporated herein by reference in its entirety.

FIELD

The subject matter described herein relates to cellular systems and, in particular, mobility in a cellular communication network.

BACKGROUND

The network data analytics function (NWDAF) is a network function which may reside on a network node or server. The NWDAF may provide analytics to other nodes and functions. For example, another node or function may request analytics, by the NWDAF, of a load of a certain network slice. The NWDAF may in turn respond with its analytics. Some aspects of the NWDAF are described in 3GPP TS 23.501 V16.4.0 (2020-03), Technical Specification.

SUMMARY

Methods and apparatus, including computer program products, are provided for ping pong detection.

In some example embodiments, there may be provided a method that includes subscribing to an event at one or more access and mobility management functions, the event indicative of a frequent mobility of a user equipment between different access and mobility management functions; and receiving, from an access and mobility management function, a notification of the subscribed event.

In some variations, one or more of the features disclosed herein including the following features can optionally be included in any feasible combination. The event may be indicative of a ping pong of the user equipment between different registration areas of the different access and mobility management functions. The event may be indicative of the user equipment having been served by the access and mobility management function for a short duration less than a threshold duration. The notification may include an identity of the user equipment, an event type indicative of the user equipment having been served by the access and mobility management function for the short duration less than the threshold duration, a time stamp, a last known cell for the user equipment, a last known tracking area for the user equipment, and/or an amount of time the user equipment stayed in the access and mobility management function. The notification may include an identity of the user equipment, an event type indicative of the ping pong between the different access and mobility management functions, and/or information about one or more short stays at the one or more access and mobility management functions. The information may include, for at least one of the stays, a time stamp, a last known cell for the user equipment, a last known tracking area for the user equipment, and/or a stay duration by the user equipment at the corresponding access and mobility management function. The subscribing to the event may include sending to the access and mobility management function a message via an event exposure service, and/or wherein the message includes the identity of the user equipment, the event type indicative of the ping pong user equipment behavior, and/or the threshold duration for the stay by the user equipment at the corresponding access and mobility management function. The message may further include a threshold number of ping pongs for triggering the notification of the subscribed event, and/or a period threshold during which the threshold number is to occur before reporting the event. The method may also include detecting, based on the received notification, that the user equipment has been served by the access and mobility management function for the short duration less than the threshold duration, for a same user equipment that is performing ping pong between different registration areas of the different access and mobility management functions.

In some example embodiments, there may be provided a method that includes receiving, at a first access and mobility management function, a subscription to an event indicative of a frequent mobility of a user equipment between different access and mobility management functions; detecting, by the first access and mobility management function, the event indicative of the frequent mobility of the user equipment; and sending, by the first access and mobility management function, a notification of the subscribed event.

In some variations, one or more of the features disclosed herein including the following features can optionally be included in any feasible combination. The event may be indicative of a ping pong of the user equipment between different registration areas of the different access and mobility management functions, and/or wherein the event is indicative of the user equipment having been served by the first access and mobility management function for a short duration less than a threshold duration. The sending may include reporting the notification of the subscribed event to a network data analytics function. The reporting may be in response to a threshold number of detected events occurring over a period threshold. The information about a previous detection, by the first access and mobility management function, of the frequent mobility of the user equipment is shared with at least a second access and mobility management function. The notification may include an identity of the user equipment, an event type indicative of the user equipment having been served by the first access and mobility management function for the short duration less than the threshold duration, a time stamp, a last known cell for the user equipment, a last known tracking area for the user equipment, and/or an amount of time the user equipment stayed in the first access and mobility management function. The notification may include an identity of the user equipment, an event type indicative of the ping pong between the different access and mobility management functions, and/or information about one or more short stays at the one or more access and mobility management functions. The information may include, for at least one of the one or more stays, a time stamp, a last known cell for the user equipment, a last known tracking area for the user equipment, and/or a stay duration by the user equipment at the corresponding access and mobility management function. The method may also include sending, to the second access and mobility management function when the user equipment is moving to the second access and mobility management function, at least one set of information as part of a context of the user equipment, wherein the at least one set of information includes a corresponding time stamp, a corresponding last known cell for the user equipment, a corresponding last known tracking area for the user equipment, and/or a corresponding stay duration by the user equipment at the first access and mobility management function. The method may also include receiving, when the user equipment is moving from the second access and mobility management function to the first access and mobility management function, at least one set of information as part of a context of the user equipment, wherein the at least one set includes a corresponding time stamp, a corresponding last known cell for the user equipment, a corresponding last known tracking area for the user equipment, and/or a corresponding stay duration by the user equipment at the second access and mobility management function. The received subscription may further include the threshold number and/or the period threshold during which the threshold number is to occur before reporting the event.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

In 3GPP mobile networks, a Network Function (NF) may be used to detect whether there is at least one user equipment (UE), such as a smart phone, cell phone, other cellular configured device, with some form of abnormal behavior. In 3GPP TS 23.288, V16.3.0 (2020-03), Technical Specification (hereinafter TS 23.288) for example, with the assistance of a Network Function such as a network data analytics function (NWDAF), one or more UEs exhibiting an abnormal behavior can be detected. Table 1 below provides a list of alerts raised by the NWDAF for UE behavior. The exception ID column describes the different types of exceptions, such as alerts, caused by an abnormality event at the UE.

TABLE 1

| Exception ID and description | Additional measurement | Access and Mobility/Session Management policy | Actions of NFs |
|---|---|---|---|
| Unexpected UE location | Unexpected UE location (TA or cells which the UE stays) | Add the area of current UE location into mobility restriction | PCF may extend the Service Area Restrictions. AMF may extend the mobility restriction |
| Ping-ponging across neighbouring cells | Numbers, frequency, time and location information, assumption about the possible circumstances of the ping-ponging | NWDAF notifies the AMF or AF (Service Provider) | If the amount of ping-ponging across neighbouring cells is above the thresholds set by the service provider, the service provider may adjust and improve the antenna tilts of the neighbouring cells or the overlapping coverage conditions in the affected location.<br>If the ping-ponging are per UE, then:<br>1. the AMF may adjust the UE (e.g. a stationary UE) registration area.<br>2. the AMF and/or the AF may allow the use of Coverage Enhancement for the affected UE. |
| Unexpected long-live/large rate flows | Unexpected flow template (IP address 5 tuple) | Decrease the MBR for the related QoS flow | SMF updates the QoS rule. PCF, if dynamic PCC applies for corresponding DNN, S-NSSAI, updates PCC Rules that triggers SMF updates the QoS rule. |
| Unexpected wakeup | Time of unexpected wake-up | Apply MM back-off timer to the UE | AMF applies MM back-off timer to the UE |

TABLE 1-continued

| Exception ID and description | Additional measurement | Access and Mobility/Session Management policy | Actions of NFs |
|---|---|---|---|
| Suspicion of DDoS attack | Victim's address (target IP address list) | Release the PDU session and Apply SM back-off timer | PCF may request SMF to release the PDU session. SMF may release the PDU session and applies SM back-off timer |
| Wrong destination address | Wrong destination address (target IP address list) | Update the packet filter of the related QoS flow to block the wrong SDF | PCF updates the packet filter in the PCC Rules that triggers the SMF to update the related QoS flow and configures the UPF |
| Too frequent Service Access/Abnormal traffic volume | Volume, frequency, time, assumptions about the possible circumstances | NWDAF notifies AF (Service Provider) | |
| Unexpected radio link failures | Numbers, frequency, time and location, assumptions about the possible circumstances | Not applicable | If the unexpected radio link failures are per UE location bases, the AMF may allow the use of CE (Coverage Enhancement) in the affected location. Also, the Operator may improve the coverage conditions in the affected location. If the unexpected radio link failures are per UE bases, then the AMF and/or the AF may allow the use of CE for the affected UE. |

One of the exception IDs at Table 1 is a ping-ponging across neighboring cells UE behavior. For example, the NWDAF's customer requests analytics on an exception ID "Ping-ponging across neighbouring cells." And, the NWDAF may subscribe to an event ID at other network functions such as an AMF to collect appropriate data from these network functions. The UE may ping pong between a first AMF associated with a first cell in a first tracking area and a second AMF associated with a second cell in a second tracking area. In order to detect ping-pong behavior, the NWDAF may subscribe, based on an event ID, to event information at the AMF, and thus obtain information, such as number of occurrences of an event, frequency, time and location, and/or assumptions about the possible circumstances. Based on the obtained information, the NWDAF may notify other Network Functions, such as an AMF, application function (AF), service provider, OAM system, or other nodes, so that the corrective actions can be taken in the network or at the very least the NWDAF may log the behavior. For example, the NWDAF may notify the OAM system or the AMF to adjust the tracking area to be served by a given AMF.

To be able to detect an abnormal behavior of the UEs, the NWDAF may need to collect information from other NFs, such as the AMF. For example, the NWDAF may seek to obtain information on the frequent mobility re-registrations (see, e.g., 3GPP TS 23.288). Table 2 below depicts an example of some of the information, which may be collected by the NWDAF.

TABLE 2

| Information | Source | Description |
|---|---|---|
| UE ID | AMF | SUPI |
| UE locations (1 . . . max) | AMF | UE positions |
| >UE location | | TA or cells that the UE enters |
| >Timestamp | | A time stamp when the AMF detects the UE enters this location |
| Type Allocation code (TAC) | AMF | To indicate the terminal model and vendor information of the UE. The UEs with the same TAC may have similar mobility behavior. The UE whose mobility behavior is unlike other UEs with the same TAC may be an abnormal one. |
| Frequent mobility re-registration | AMF | A UE (e.g. a stationary UE) may re-select between neighbour cells due to radio coverage fluctuations. This may lead to multiple re-registrations if the cells belong to different registration areas. The number of re-registrations N within a period M may be an indication for abnormal ping-pong behaviour, where N and M are operator's configurable parameters. |

In some example embodiments, there are provided ways to detect UE ping ponging. The ping ponging may be between NFs, such as AMFs. For example, a UE may be (i) camped on or served by a first cell of a plurality of cells of a first tracking (or registration) area and thus registered with and served by a first AMF, (ii) move to a second cell (as part of a cell reselection or a cell handover) of a plurality of cells of the second tracking (or registration) area and be served by a second AMF, and (iii) then return to the first cell of a plurality of cell of the first tracking (or registration) and thus be served again by the first AMF, and so forth. In this example, if the UE returns to the first AMF within a short period of time, this may indicate a ping pong between different AMFs. In other words, the UE was served by (or stayed at) the second AMF for the short period of time. And if this is done repeatedly over a period of time, this short stay type UE behavior may also be considered anomalous ping ponging. And, this ping ponging may cause unnecessary signaling overhead with the core network and between the network nodes as they transfer context information for the ping ponging UE.

In some example embodiments, the AMF may provide to subscribers information about the event, such as the ping pong, via an event ID indicative of the ping ponging. See, e.g., 3GPP TS 23.502, V16.4.0 (2020-03), hereinafter 3GPP TS 23.502. This event ID may be used through a Namf_EventExposure service (e.g., an application program interface (API)). See 3GPP document S2-2001856. The Namf_EventExposure service enables a network function, such as NWDAF, to subscribe and be notified of different types of events via the event ID. For example, the NWDAF may subscribe to, and be notified of, events at the AMF, such as location changes; a UE moving in or out of a subscribed area of interest; a quantity (e.g., number) of UEs being served by an AMF and located in an area of interest; UE time zone; access type changes (e.g., 3GPP access or non-3GPP access); registration state changes (e.g., registered or deregistered); connectivity state changes (e.g., IDLE or CONNECTED); UE loss of communication; UE reachability status; UE indication of switching off SMS over network access stratum (NAS) service; subscription correlation ID change (implicit subscription); type allocation code (TAC); frequent mobility re-registration; subscription correlation ID addition (implicit subscription); and user state information in the 5G system.

While subscribing to an event ID associated with, for example, frequent mobility re-registration by a given UE, the NWDAF may be able to detect UEs ping ponging between different registration areas served by the same AMF. Although this AMF can detect a UE ping-ponging between its own registration areas and adjust registration areas accordingly for the UE, the AMF cannot detect a UE ping ponging between registration areas served by different AMFs, such as between a first (or, e.g., a source) AMF and a second (or, e.g., a target) AMF.

In some example embodiments, a network node or function, such as the NWDAF, may request a NF, such as a mobility NF like a first AMF, to inform the NWDAF of a mobility event to a second AMF for a given UE, when this UE has been served by the first AMF for only a short period of time (e.g., less than a threshold amount of time, T1). In some example embodiments, when the NWDAF receives the information from the first AMF that, for the given UE, this mobility event occurred from the first AMF to the second AMF (where the UE only stayed under first AMF for a short period of time) and receives additional information that there was another mobility event from the second AMF to the first AMF for this same UE (where the UE stayed under the second AMF for a short period of time less than T1), the NWDAF may conclude that the UE may be ping ponging between different AMFs, such as the first AMF and the second AMF.

In some example embodiments, there is provided a new event ID (which can be subscribed to) that indicates that a UE is ping ponging, such as the noted ping ponging between different AMFs. The event ID identities the type of event being subscribed to at the AMF, which in the example is ping ponging UE event. This new event ID may indicate, for the Namf_EventExposure service, mobility to another AMF while the UE has been served by the AMF for a short time. The subscription to this event ID may include a duration threshold, T1. This duration threshold may be configured by the event consumer, such as the NWDAF, to allow the event consumer to be notified only if the UE has been served by the AMF for a duration lower than a threshold duration T1. The threshold T1 may be specified or configured by an operator of the system, for example. In some example embodiments, the NWDAF may subscribe at an AMF to the new event ID for a specific UE, a group of UEs, or all UEs. The value of T1 may be on the order of second or tens of seconds, although other values may be used as T1.

In some example embodiments, the AMF may notify the subscribing NWDAF, when detecting the mobility event (e.g., when the UE context is requested to be transferred to the target AMF). The AMF may also provide in the notification to the NWDAF the identity of the UE (or a list if more than one UE is exhibiting the ping pong behavior), and a time when the mobility event occurred or was reported. Alternatively or additionally, the AMF's event notification to the NWDAF may include, for each ping ponging UE, the last cell (and/or tracking area) from which the UE last contacted the AMF (which is providing the notification to the NWDAF) and/or a time duration during which the UE has been served by this AMF.

When the NWDAF receives corresponding notifications from two different AMFs for the same UE, this may be, as noted, an indication to the NWDAF of abnormal ping pong behavior between two different AMFs, in accordance with some example embodiments. Alternatively or additionally, the NWDAF may decide that ping pong occurs after a number (M) of such notifications occurring over a period of time (e.g., period threshold) T2. M and T2 may also be operator's configurable parameters. For example, M may be configured to 5 and T2 may be configured to 10 minutes, although other values of M and T2 may be used as well.

Although some of the examples refer to the NWDAF, other network nodes or Network Functions may be used as well to detect the UE ping pong behavior. Furthermore, although some of the examples refer to the AMF, other nodes or functions, such as those associated with UE mobility or UE access management may be used as well. In addition, although some of the examples refer to a UE ping ponging between 2 AMFs, the UE may ping pong among 3 or more AMFs as well.

Figure 1:
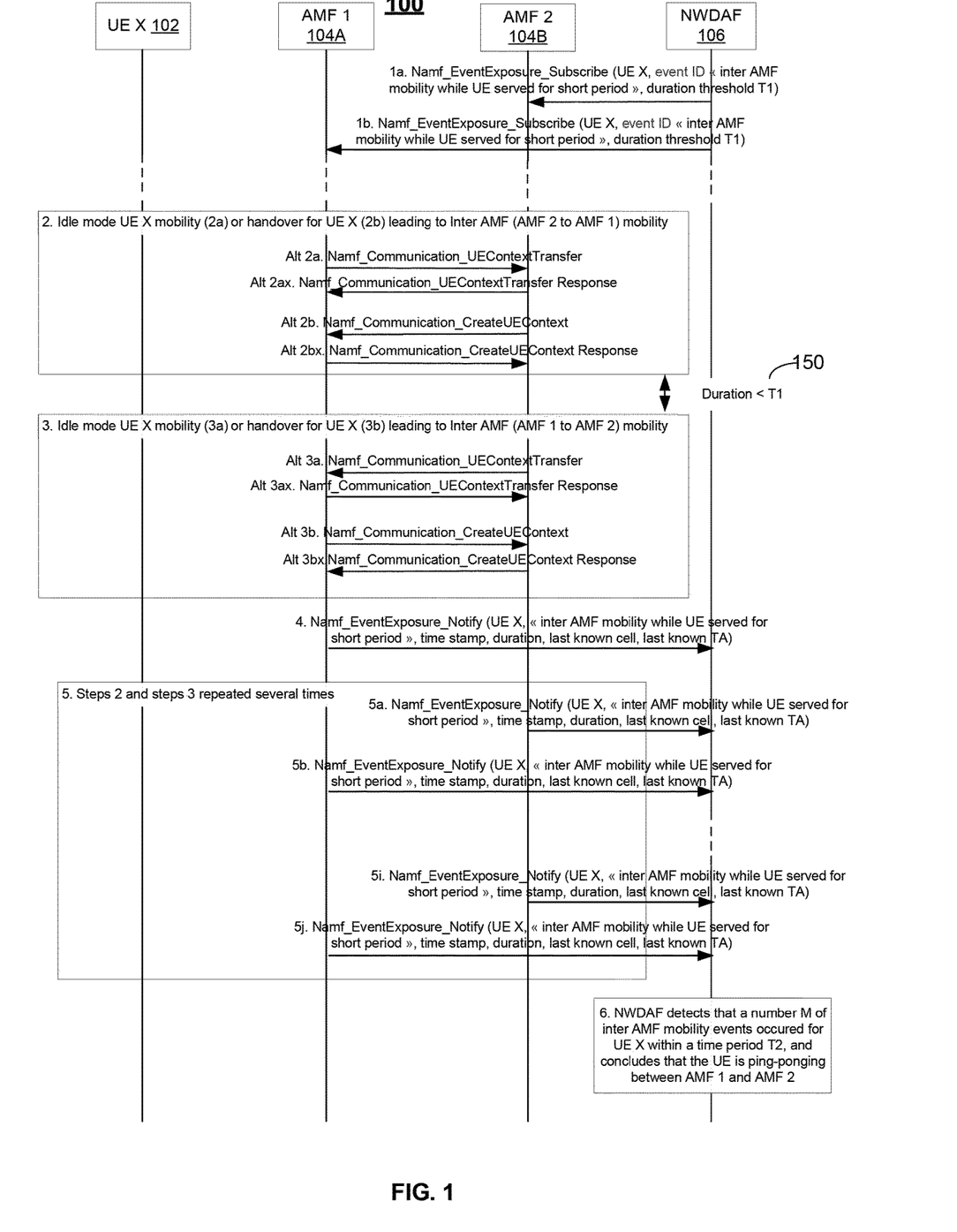
FIG. 1 depicts a signaling diagram for a process of detecting ping ponging, in accordance with some example embodiments.

FIG. 1 depicts an example of a process 100 for detecting ping pong behavior by a UE 102 (labeled "UE X"), in accordance with some example embodiments. FIG. 1 further shows a first AMF 104A, a second AMF 104B, and another network node, such as NWDAF 106.

At 1a, the NWDAF 106 may send to the second AMF 104B a message to subscribe to (and thus receive) events indicative of ping ponging behavior by a UE. In the example, the NWDAF sends to the second AMF a subscribe message, such as the Namf_EventExposure Subscribe message which is sent via the Namf_EventExposure service (e.g., API). This subscribe message may identify one or more UEs, such as the UE 102, the event ID for the event being subscribed to (which in this example is the event ID for "Inter AMF mobility while UE served for a short period"), and/or the duration threshold, T1, of that short period.

At 1b, the NWDAF 106 may send to the first AMF 104A a message to subscribe to (and thus receive) events indicative of ping ponging behavior by a UE. The message at 1b may be the same or similar to the form of the message at 1a.

In the example of FIG. 1, the UE 102 is initially registered with (e.g., accessing, being served by, camped on, etc.) the second AMF 104B. For example, the UE 102 may be in a cell, tracking area, or registration area associated (e.g., served by or camped on) the second AMF 104B. For example, the UE 102 may be in an idle mode (e.g., not active and/or not engaged in an on-going service) and attempting cell reselection to ensure that the idle mode UE is camped on the best cell in terms of signal strength and quality. This idle mode UE may be attempting to perform a cell reselection which causes the idle mode UE to register with the first AMF 104A (with the effect that the UE is no more served by the second AMF 104). When this is the case, the first AMF 104A may send, at 2a, a UE context transfer request to the second AMF 104B, which responds, at 2ax, with a UE context transfer response.

Alternatively, the UE 102 may be subject of a handover to a first cell associated with the first AMF 104A. This handover causes the UE 102 to register with the first AMF 104A. When this is the case, the second AMF 104A may send, at 2b, a create UE context request to the first AMF 104B, which responds, at 2bx, with a create UE context response.

At 150, the UE 102 may be attempting a cell reselection or handover within short duration, such as less than T1 (which was indicated by the subscribe messages at 1a and 1b). The first AMF served the UE 102 for less than the threshold duration, T1 150. In other words, the UE 102 has a short stay (less than time T1) at the first AMF.

At 3a, the UE 102 (which is in idle in this example) may be attempting to perform a cell reselection which causes the UE to register again with the second AMF 104B. When this is the case, the second AMF 104B may send, at 3a, a UE context transfer request to the first AMF 104A, which responds, at 3ax, with a UE context transfer response.

Alternatively, the UE 102 may be subject of a handover to the second cell associated with the second AMF 104B. This handover causes the UE to register with the second AMF 104B. When this is the case, the first AMF 104A may send, at 3b, a create UE context request to the second AMF 104B, which responds, at 3bx, with a create UE context response.

In the example of FIG. 1, the duration that the UE 102 remains at the first AMF 104A before returning to the second AMF 104B is less than the threshold duration "T1" (as shown at 150), which is the duration specified by the event subscribe messages at 1a and 1b. This threshold duration "T1" may be considered a minimum duration that a UE is normally expected to remain served by an AMF. As such, the first AMF knows that the UE's 102 short stay behavior at the first AMF is a reportable event. To that end, the first AMF 104A, sends, at 4, a notification message to the NWDAF 106. This notification message may include the identify the UE 102, an indication that the event is related to subscribed event ID (which in this example is the "Inter AMF mobility while UE served for a short period"), a time stamp representative of when the ping pong event occurred or was reported, a duration (e.g., the actual amount of time the UE was served by the first AMF before returning to the second AMF), a last known cell for the UE 102, a last known tracking area for the UE 102, and/or other information.

Each time an AMF detects the UE's inter AMF mobility behavior being less than the threshold duration of T1, an AMF may report that event as shown at 5a, 5b, 5i, and 5j. This allows the NWDAF 106 to collect (e.g., aggregate) the event information.

At 6, the NWDAF 106 may detect that a certain quantity of the notifications (e.g., event notification message 4) is occurring over a period of time T2. For example, if the NWDAF receives M inter AMF mobility notification events from the AMFs within time period T2 for a given UE, such as UE 102, the NWDAF may conclude that the given UE is ping ponging, such as ping ponging between the first AMF and the second AMF. To illustrate further with an example, if the NWDAF receives 5 (M) notification messages (e.g., event notification message 4) over a time of 10 minutes (T2), the NWDAF may conclude the UE 102 is ping ponging, although other values of M and T2 may be used as well as this was merely an example.

Figure 2:
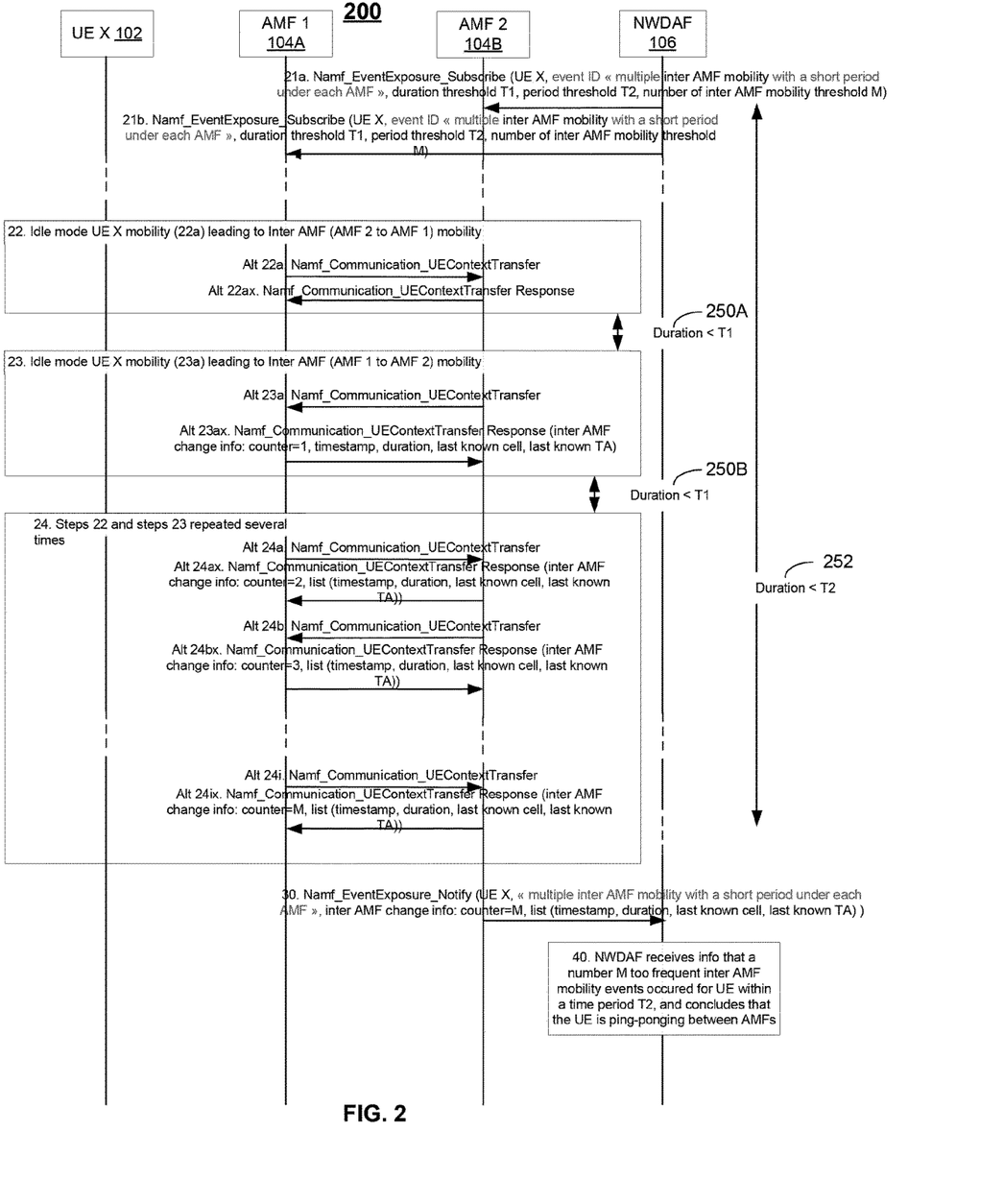
FIG. 2 depicts another signaling diagram for a process of detecting ping ponging, in accordance with some example embodiments.

FIG. 2 depicts another example of a process 200 for detecting ping pong behavior by a UE, such as UE 102, in accordance with some example embodiments. The process 200 is similar to process 100 at FIG. 1 in some respects, but the process 200 provides additional information to the AMFs 104A-B to reduce the signaling between the NWDAF and AMFs. To illustrate further, if UE 102 ping pongs between different AMFs M times within time period T2 252, wherein each of the M ping pongs has a duration of time lower than T1 250A-B, an AMF reports, at 30, that event to the NWDAF. As such, the event notification reported to the NWDAF at 30 represents an AMF's aggregation of the individual ping pong events until they reach the threshold quantity M within time period lower than T2.

At 21a, the NWDAF 106 may send to the second AMF 104B a message to subscribe to and thus receive events indicative of ping ponging behavior by a UE. In the example, the NWDAF sends to the second AMF a subscribe message, such as the Namf_EventExposure_Subscribe message which is sent via the Namf_EventExposure service API. This subscribe message may identify one or more UEs (which in this example is the UE 102), event ID (which in this example identifies UE mobility events related to "multiple inter AMF mobility with a short period under each AMF"), the duration threshold (T1), the period threshold (T2), and/or the number of the inter AMF mobility threshold, M.

At 21b, the NWDAF 106 may send to the first AMF 104A a message to subscribe to and receive events indicative of ping ponging behavior by a UE. The message at 21b may be the same or similar to the message 21a of FIG. 2.

In the example of FIG. 2, the UE 102 is initially registered with the second AMF 104B. For example, the UE 102 may be in a cell, tracking area, or registration area associated (e.g., served by) the second AMF 104B. The UE may be attempting to perform a cell reselection which causes the UE 102 to register with the first AMF 104A. When this is the case, the first AMF 104A may send, at 22a, a UE context transfer request to the second AMF 104B, which responds, at 22ax, with a UE context transfer response. As shown, within a short duration which is less than the duration threshold T1 250A (which was signaled by 21a and 21b), the UE may be attempting to perform a cell reselection which causes the UE 102 to register again with the second AMF 104B. When this is the case, the second AMF 104B may send, at 23a, a UE context transfer request to the first AMF 104A, which responds, at 23ax, with a UE context transfer response.

In some example embodiments, the context response at 23ax may include additional information (when compared to 3ax at FIG. 1). Specifically, the context response may include information about the inter AMF mobility event, such as the counter value, in accordance with some example embodiments. This counter values allows the different AMFs to track the number of short duration AMF stays (e.g., the inter AMF mobility events for the UE 102). In this example, the counter is "1" as this is the first inter AMF mobility event. The context response at 23ax may also include a time stamp indicative of when the inter AMF mobility event occurred or was reported, actual duration of time the UE remained in the AMF, last known cell for the UE, last known tracking area for the UE, and/or other information about the AMF change.

At 24a, the UE 102 performs a cell reselection which causes the UE to revert and thus register again with the first AMF 104A within a short duration, lower than T1 250B. When this is the case, the second AMF 104B sends, at 24ax, a context response. The context response indicates the counter value of "2" as this is the second inter AMF mobility event having a short duration (e.g., less than T1).

At 24b, the UE 102 performs a cell reselection which causes the UE to again register with (e.g., access, served by, camp on, stay at, etc.) the second AMF 104B. When this is the case, the first AMF 104A sends, at 24bx, a context response. The context response indicates the counter value of "3" as this is the third inter AMF mobility event having a short duration (e.g., less than T1).

Although FIG. 2 depicts an example of cell reselections at 22-24, the ping pong may occur as a result of handovers as well.

This ping ponging may occur M times, as noted. At 24i for example, the UE 102 performs a cell reselection which causes the UE to revert and thus register again with the first AMF 104A. When this is the case, the second AMF 104B sends, at 24ix, a context response. The context response indicates the counter value of "M" as this is the $M^{th}$ inter AMF mobility event having a short duration (e.g., less than T1). As this is the $M^{th}$ AMF mobility event occurring within duration lower than T2 252, the second AMF 104B detects this as a reportable event to the NWDAF 106 given the configuration provided at 21a. As such, the second AMF 104B may send, at 30, an event notification message to the NWDAF. This notification message may include information associated with the subscribed ping ponging event among AMFs. For example, the notification may include the identify the UE 102, inter AMF change information, such as the counter value M and a list of the UEs inter AMF mobility events In the example of FIG. 2 for example, this list may include, for UE 102, information about each of the UE's short stays considered a ping pong. For each of the M short stays (less than T1) at an AMF occurring within the period T2, the list may include a time stamp, a duration the UE 102 was at the corresponding AMF, a last know cell for the UE, a last know tracking area, and/or other information about the UE's mobility event.

In some implementations, the counter value may not be shared. In some instances, AMF may count how many short stays are present in the list of information about one or more short stays at the one or more access and mobility management functions and that are within the time window (current time-T2) to decide whether the number of short stays reached M. In some instances, the counter may be decremented, when AMF realizes that some of information about one or more short stays at the one or more access and mobility management functions is older than (current time-T2). As noted, the counter may be not be used (e.g., if each AMF checks the list of information about one or more short stays at the one or more access and mobility management functions and counts the number of short stays within the time window (current time-T2) and if the number is M then triggers a notification to NWDAF).

At 40, the NWDAF 106 may conclude, based on the information received at 30, that the UE 102 (which is identified at 30) is ping ponging between the first AMF and the second AMF. In the example of FIG. 2, the NWDAF conditions the detection of a ping ponging UE between different AMFs based on UE 102 ping ponging between different AMFs 104A-B M times within time period less than T2 252, wherein each of the M ping pongs has a duration of time less than T1 250A-B. When compared to FIG. 1, the AMFs aggregates the individual ping pong events until they reach the threshold quantity M within a time period less than T2.

Figure 3:
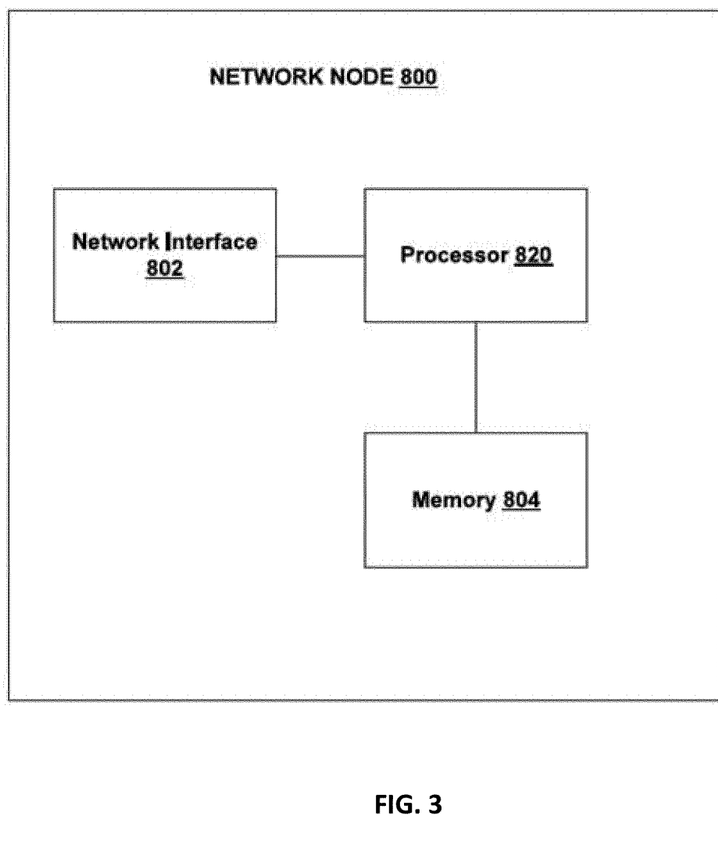
FIG. 3 depicts an example of a network node, in accordance with some example embodiments.

FIG. 3 depicts a block diagram of a network node 800, in accordance with some example embodiments. The network node 800 may be configured to provide one or more network side functions, such as an AMF, AF, NWDAF, and/or other network nodes. The network node 800 may include a network interface 802, a processor 820, and a memory 804, in accordance with some example embodiments. The network interface 802 may include wired and/or wireless transceivers to enable access other nodes including base stations, the Internet, and/or other nodes and network functions. The memory 804 may comprise volatile and/or non-volatile memory including program code, which when executed by at least one processor 820 provides, among other things, the processes disclosed herein with respect to the network node.

Figure 4:
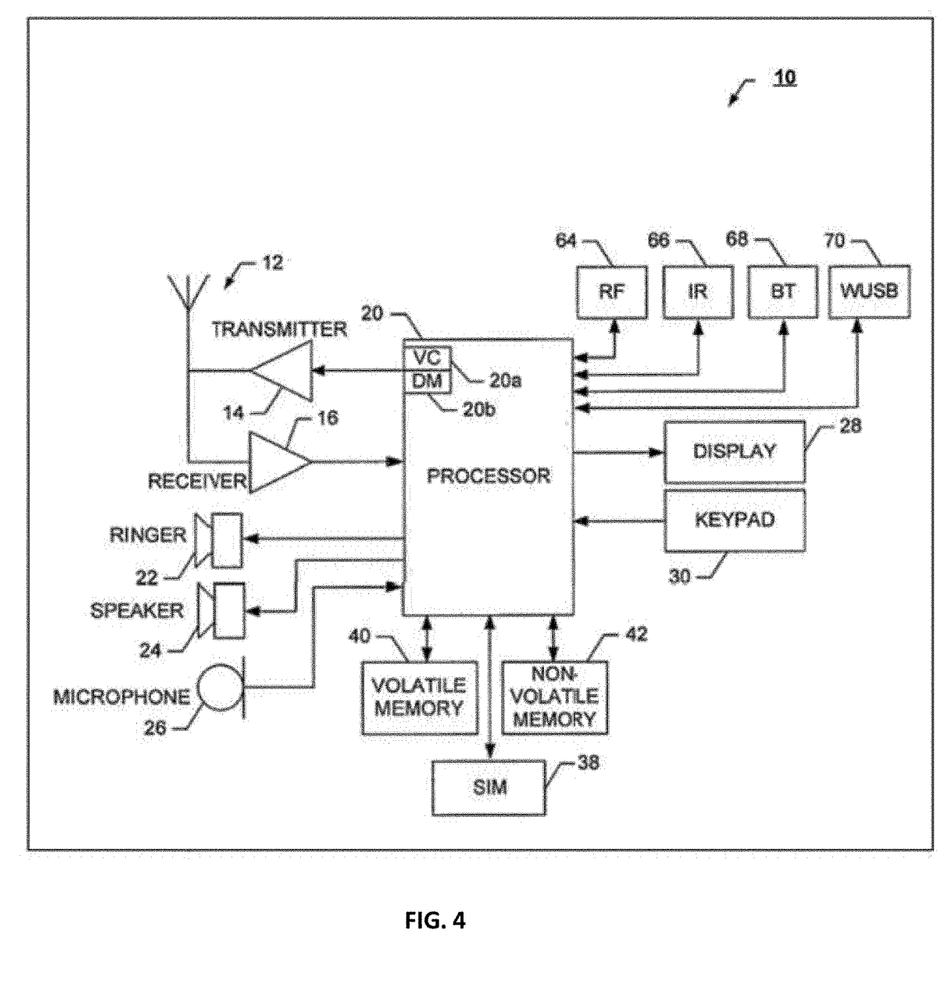
FIG. 4 depicts an example of an apparatus, in accordance with some example embodiments.

FIG. 4 illustrates a block diagram of an apparatus 10, in accordance with some example embodiments. The apparatus may comprise or be comprised in a user equipment, such as user equipment 102.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein. Alternatively or additionally, the apparatus may be configured to cause the operations disclosed herein with respect to the base stations/WLAN access points and network nodes including the UEs.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may include enhanced network configurations which reduce UE ping ponging among AMFs.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed is:

1. A method performed by a network data analytics function of a core network, the method comprising:
    subscribing to a first access and mobility management function of the core network to be notified about an event indicative of mobility of a user equipment to a second access and mobility management function while the user equipment has been served by the first access and mobility management function for a short duration less than a threshold duration;
    receiving, from the first access and mobility management function, a notification of the event and a plurality of further notifications of the event; and
    determining, based on the notification and the plurality of further notifications, that the user equipment is ping ponging between the first access and mobility management function and the second access and mobility management function, wherein the notification and the plurality of further notifications are received during a period of time, and wherein the user equipment is determined to be ping ponging between the first access and mobility management function and the second access and mobility management function when a number of notifications received over the time period exceeds a threshold number of notifications.

2. The method of claim 1, wherein the notification includes at least one of an identity of the user equipment, a time stamp of the event, a last known cell for the user equipment, a last known tracking area for the user equipment, or an amount of time of the user equipment has been served by the first access and mobility management function.

3. The method of claim 1, wherein the subscribing comprises sending to the first access and mobility management function a message comprising an identity of the user equipment, an event identifier for the event, and the threshold duration.

4. A method comprising:
receiving, at a first access and mobility management function of a core network, a subscribe message to be notified of a ping pong event indicative of a ping pong by a user equipment between a second access and mobility management function and the first access and mobility management function; and
detecting, by the first access and mobility management function, a threshold number of mobility events within a threshold period of time, wherein each mobility event of the plurality of mobility events is indicative of mobility of the user equipment to the second access and mobility management function while the user equipment has been served by the first access and mobility management function for a short duration less than a threshold duration; and
sending, by the first access and mobility management function, a notification ping pong event.

5. The method of claim 4, wherein the notification of the ping pong event includes at least one of an identity of the user equipment and information about each mobility event of the plurality of mobility events.

6. The method of claim 5, wherein the information about each mobility event comprises at least one of the identity of the user equipment, a time stamp of the event, a last known cell for the user equipment, a last known tracking area for the user equipment, or an amount of time of the user equipment has been served by the access and mobility management function.

7. The method of claim 4, wherein the subscribe message comprises an identity of the user equipment, an event identifier for the ping pong event, the threshold duration, the threshold period of time, the threshold number of mobility events.

* * * * *